United States Patent [19]

Slack et al.

[11] Patent Number: 4,602,733
[45] Date of Patent: Jul. 29, 1986

[54] DESOLDERING APPARATUS AND METHOD

[75] Inventors: John R. Slack, Vestal, N.Y.; William D. von Voss, Austin, Tex.

[73] Assignee: International Business Machines Corporation, Armonk, N.Y.

[21] Appl. No.: 690,389

[22] Filed: Jan. 11, 1985

Related U.S. Application Data

[63] Continuation of Ser. No. 450,170, Dec. 16, 1982, abandoned.

[51] Int. Cl.⁴ .................. B23K 3/04; H05K 13/04
[52] U.S. Cl. .................. 228/242; 219/85 CM; 228/20; 228/264
[58] Field of Search .......... 228/20, 264, 240, 242; 219/230, 85 CA, 85 CM

[56] References Cited

U.S. PATENT DOCUMENTS 3,045,095  7/1962  Usher et al. ............... 228/20 X
3,422,247  1/1969  Royston et al. ............ 219/230

FOREIGN PATENT DOCUMENTS 875398  8/1961  United Kingdom ............ 228/20

OTHER PUBLICATIONS

IBM Technical Disclosure Bulletin, vol. 25, No. 2, Jul. 1982, pp. 551-552.
IBM Technical Disclosure Bulletin, vol. 23, No. 9, Feb. 1981, pp. 4072-4073.

*Primary Examiner*—Kenneth J. Ramsey
*Attorney, Agent, or Firm*—David L. Adour; Kenneth P. Johnson

[57] ABSTRACT

Apparatus for the selective removal of the solder and a connector soldered in the through hole of a circuit panel including means for heating the solder and a pair of aligned tubes placed against opposite surfaces of the panel surrounding the connecting through hole with the tubes being supplied with fluid under pressure so as to produce a pressure differential across the solder column in the through hole and effective to urge the connector and solder from the through hole into the low pressure tube when the solder is melted.

8 Claims, 2 Drawing Figures

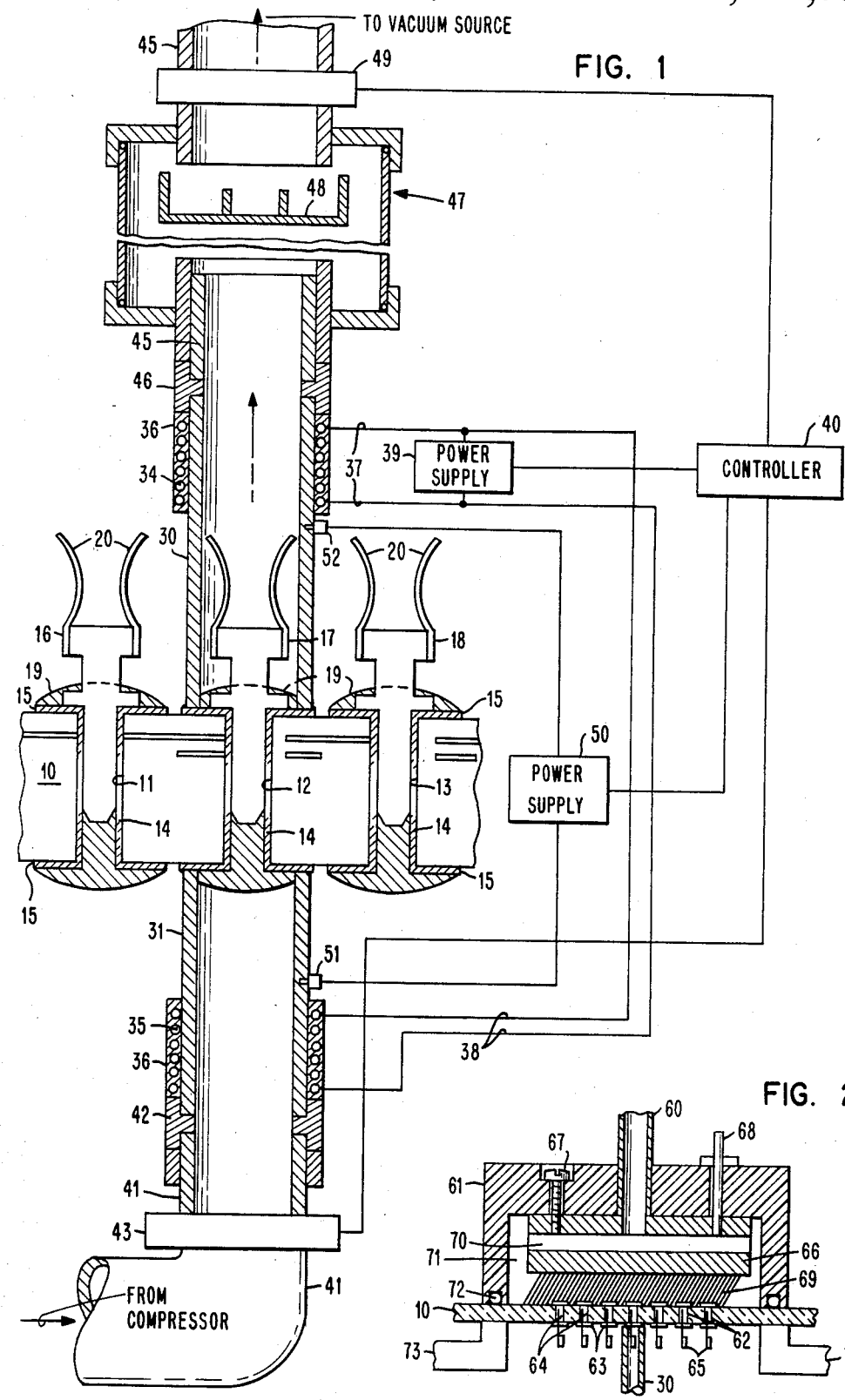

DESOLDERING APPARATUS AND METHOD

This application is a continuation, of application Ser. No. 450,170, filed 12/16/82, now abandoned.

BACKGROUND OF THE INVENTION

This inventon relates generally to desoldering apparatus and method and, more particularly, to such apparatus and method employing a fluid pressure differential along a softened solder column.

Individual pin or wire connectors soldered into through holes in circuit substrates or panels frequently must be replaced because of damage or circuit changes. The connectors and through holes are usually located on close center-to-center distances to achieve the required packaging density. Therefore, when selective connector replacement is undertaken, small tools and slow, careful extraction effort are necessary.

In the past, the solder of a selected connector has been usually softened and melted with a fine jet of heated gas such as nitrogen. The gas, being under pressure, also flows over a surrounding area with sufficient heat to soften the solder of neighboring connectors, allowing them to become misaligned. The repeated reheating fosters change in the solder composition through intermetallic growth and raises the temperature of the melting point. Further, if the connector is made of a wettable material, often solder will climb the connector shaft and ultimately interface with the contact surfaces of the connector. To avoid these difficulties, shims, brackets or shields are first installed to support the nearby connectors or to deflect the hot gas. This procedure extends the time necessary to accomplish the connector removal.

Another disadvantage of the usual connector removal processes is that of leaving varying amounts of solder in the through hole. The residue frequently interferes with optical locating procedures that are required when the through hole wall is to be subsequently drilled away and the hole enlarged for a circuit change. Vacuum solder removal tools, exemplified by that in U.S. Pat. No. 3,406,274, and possible reheating are employed to produce the necessary clean holes.

OBJECTS AND SUMMARY OF THE INVENTION

It is accordingly a primary object of this invention to provide desoldering apparatus for connectors which more closely confines the solder melting heat at the selected location while applying a fluid pressure differential across the selected location to remove both connector and solder.

Another important object of this invention is to provide a desoldering apparatus that uses aligned tubes at opposite ends of a connector and solder column to produce a fluid pressure differential forcing displacement of the column when sufficiently melted.

Yet another object of this invention is to provide desoldering apparatus in which aligned, electrically conductive tubes are placed at opposite ends of a solder column and operate to resistively heat the column while maintaining a fluid pressure differential across the column.

A still further object of this invention is to provide a process for desoldering a circuit connector or solder column in which a fluid pressure differential is maintained across the column during heating and melting of the solder.

The foregoing objects are attained in accordance with the invention by providing a pair of electrically conductive, hollow members aligned with each other and in contact with opposite ends of a solder column in a through hole in a circuit panel. These two members are supplied with pressurized fluids such that a pressure differential is created along the column. The members are heated and convey heat to melt the solder column allowing the fluid pressure of one member to force the connector and melted solder into the other member as a collector leaving the through hole wall clear of solder. The hollow members can be heated and conduct heat to the solder column and they can also serve as electrodes in series with the solder to provide a resistive heating circuit.

A significant advantage of the invention is that of selectively removing the desired connector or solder column without detrimental softening of neighboring columns while concentrating energy at the selected column. The fluid stream is further able to remove nearly all solder from the through hole, readily enabling further processing of the panel. The invention eliminates the need for installing shims or brackets thus making connector removal much more efficient. Also eliminated is the need for complicated gripping devices.

The foregoing and other objects, features and advantages of the invention will be apparent from the following more particular description of preferred embodiments of the invention, as illustrated in the accompanying drawing.

BRIEF DESCRIPTION OF THE DRAWING

FIG. 1 is an elevation view in section of a circuit panel and desoldering apparatus constructed in accordance with the principles of the invention;

FIG. 2 is a sectional view of a modification of the invention in FIG. 1.

DESCRIPTION OF THE PREFERRED EMBODIMENT

Referring to FIG. 1, a multi-layer circuit panel 10 is shown with thru holes 11, 12 and 13, typically having their walls plated with a coating 14 of a metal such as copper having a coating of tin. The tinned copper extends as lands 15 on opposite surfaces of panel 10 at the ends of respective holes 12. Connectors 16, 17 and 18 are secured in their respective thru holes by solder 19. The connectors may be any of a variety of devices or pins and are shown here formed with resilient flanges 20 for receiving pins from pluggable modules or components, not shown.

At times selected ones of connectors 16–18 must be removed because of circuit changes or damage. Desoldering is accomplished by an arrangement in which an evacuated duct 30 and a duct 31 to which pressurized fluid is supplied are placed in alignment at opposite ends of plated through hole 12 having solder column 19. Ducts 30 and 31 are preferably constructed of molybdenum or beryllium copper for good heat and current conduction and non-wetting by the solder. The ducts have outside diameters approximating the diameter of circuit lands 15 and inside diameters that allow the ducts to be slid over flanges 20 of the connectors. Each of ducts 30 and 31 is wound with a respective coil of electrical resistance heating element 34 and 35 embedded in a matrix of insulative ceramic material 36. These two coils are further connected through leads 37 and 38 to power supply 39 energized through controller 40.

Duct 31 is connected to a duct 41 by means of a ceramic, insulative collar 42. Duct 41 connects with solenoid valve 43 operated by means of the controller 40 or a switch. Beyond valve 43 duct 41 is further connected to a source of compressed fluid such as air, inert gas or glycerine at a positive pressure of 10 to 60 psi. The fluid is preferably passed through a heater to maintain the fluid near the melting temperature of the solder. Evacuated duct 30 likewise is connected to a duct 45 through a ceramic collar 46 for thermal isolation. Duct 45 is assembled with a debris trap generally indicated as 47 into which molten solder or the connector or other debris are forced after being removed by the fluid pressure. The debris trap may include a baffle 48 or filter material to prevent solder particles from reaching the vacuum source, not shown, to which the debris trap is connected. A solenoid valve 49 serves to selectively connect duct 30 to the source of lower relative pressure such as negative pressure or vacuum.

Both ducts 41 and 45 are preferably of flexible construction or larger diameters for ease of handling. It is contemplated that hollow members or ducts 30 and 31 and their connected assemblies be used as hand tools during the selective removal of a solder column or connector. The assemblies can optionally and preferably be attached to automated precision positioning apparatus, if desired.

Each conductive duct 30 and 31 is further connected via leads to a terminal of power supply 50 by means of screws 51 and 52. Power supply 50 is operated through controller 40 and is turned on when ducts 30 and 31 are in contact with the solder on selected through hole lands to supply a relatively large current in a range of 14 to 40 amps.

In operation, ducts 30 and 31 are placed on the surface of the solder meniscus or fillet on the opposite lands 15 of the connector selected for removal. This placement also envelopes the connector. Resistance coils 34 and 35 are energized to preheat ducts 30 and 31 for a brief time to soften the solder surfaces so that the ducts become well seated at the lands or on the solder and lands. Thereafter, the controller 40 energizes the lower resistance circuit of ducts 30, 31 and the solder column via a large current causing the solder column 19 at connector 17 to soften. As the solder heats, solenoid valves 43 and 49 are energized to open the ducts that supply differential fluid pressure along the solder column. When the solder temperature reaches its melting point, the molten solder and the connector are rapidly forced from the through hole leaving a relative solder-free hole wall. Controller 40 then terminates the current through the ducts and hole wall and solenoid valves 43 and 49 are de-energized and closed.

The internal and external diameters of ducts 30, 31 can, of course, be varied to accommodate the various connector or through hole sizes and center-to-center spacing of holes. In certain instances, the connectors may extend beyond the hole land edges while being less than the land diameter in a transverse direction; the ducts can be formed in an oval or rectangular cross section to accommodate the connector and land dimensions. In still other instances, the through holes may not have lands on the circuit panel; the diameters of ducts 30, 31 can then be sized or tapered to insure adequate contact with the hold wall and solder column therein.

A modification of the invention is shown in FIG. 2. In this embodiment hollow member 60 has been enlarged by an attached housing 61 to enclose on circuit board 10 a plurality of through holes 62 having lands 63 and solder columns 64 holding connectors 65. Housing 61 is of insulative material and has a block 66 of conductive metal secured thereto by suitable means such as screws 67. An electrical terminal 68 extends from block 66 through the housing to be connected to a terminal of an electrical supply. Block 66 has a plurality of flexible conductive bristles 69 secured therein having a length sufficient to deflect when housing 61 is placed in contact with the lands and surface of circuit board 10. The bristles may be of a resilient material such as beryllium copper that is both conductive and non-wettable by the solder. Block 66 also has formed therein ducts 70 to allow the internal chamber 71 to be pressurized by the fluid supplied to hollow member 60. Housing 61 is also provided with a seal 72 along its edge adjacent circuit board 10 to prevent leakage of the pressurized fluid.

In use, circuit board 10 is placed on a pair of supports 73 and housing 61 is positioned so as to enclose a plurality of selected through holes 62 having solder columns 64 or connectors 65 therein. When the housing 61 is brought into contact, sealed chamber 71 is formed which can be pressurized through duct 60 with a fluid. Bristles 69 of block 66 contact the circuit lands and exposed solder columns on the surface of the board. A conductive, evacuated, hollow duct such as 30 in FIG. 1 is then selectively brought into contact with the circuit land and the solder column or connector to be removed. Duct 30 and block 66 are then energized to resistively heat the selected solder column between bristles 69 and hollow member 30 to melt the solder column. When the solder becomes molten, the fluid pressure within chamber 71 forces the connector and solder column into hollow member 30. It will be noted from the foregoing that the housing can enclose and contact a plurality of solder columns while the selection is made with the hollow member 30, thus providing the capability of choosing a single solder column or connector to be removed.

While the invention has been particularly shown and described with reference to preferred embodiments thereof, it will be understood by those skilled in the art that the foregoing and other changes in form and details may be made therein without departing from the spirit and scope of the invention.

What is claimed is:

1. The method of removing a solder column from a conductively walled through hole in a circuit panel comprising the steps of:

contacting the ends of a plurality of solder columns with electrically conductive elements while enclosing said contacted ends in a chamber pressurized by fluid;

contacting the opposite end of a selected one of said enclosed columns with a conductive hollow member; and applying electrical current between said electrically conductive elements and said hollow member to resistively heat said column and melt said solder whereby said fluid pressure forces said solder into said hollow member.

2. The method according to claim 1 wherein said hollow member is evacuated to a fluid pressure less than atmospheric.

3. Apparatus for removing a solder column from a selected conductively walled through hole in a circuit panel having a plurality of such through holes with solder columns, comprising:
- first and second hollow members aligned with said selected through hole and said solder column on opposite sides of said panel while in electrical contact with said wall or said solder, with one of said hollow members enclosing a plurality of said solder columns and wherein said one hollow member includes a plurality of electrical elements therein in contact with each of said plurality of solder columns for conducting current thereto;
- means for concurrently applying fluid pressure to said members so as to produce a pressure differential across said selected solder column; and
- means for heating said selected solder column to its melting point whereby said solder is forced from said through hole.

4. Apparatus for removing a solder column and a connector element from a selected conductively walled through hole in a circuit panel having a plurality of such through holes with solder columns and connector elements in relatively close spaced relationship, comprising:
- a first hollow member sized and configured for enclosing said selected conductively walled through hole and the connector element extending therefrom on a first side of said circuit panel;
- a second hollow member sized and configured for enclosing said selected conductively walled through hole on the side of said circuit panel opposite to the first side of said circuit panel;
- pressure producing means for controlling fluid pressure within the first and second hollow members to provide a desired pressure difference across said selected conductively walled through holes;
- first heating means for heating the solder column in said selected conductively walled through hole to the melting point of the solder column whereby the solder column and the connector element are forced from said conductively walled through hole by the pressure difference provided across said conductively walled through hole by the pressure producing means; and
- second heating means for preheating the first and second hollow members to soften solder in physical contact with the first and second hollow members on said circuit panel whereby a seal is formed between each of the first and second hollow members and said circuit panel prior to forcing the solder column and the connector element from said conductively walled through hole.

5. Apparatus as recited in claim 4 wherein said second heating means comprises:
- resistance coils for conductively preheating each of the first and second hollow members.

6. Apparatus for removing a solder column and a connector element from a selected conductively walled through hole in a circuit panel having a plurality of such through holes with solder columns and connector elements in relatively close spaced relationship, comprising:
- a first hollow member sized and configured for enclosing said selected conductively walled through hole and the connector element extending therefrom on a first side of said circuit panel;
- a second hollow member sized and configured for enclosing said selected conductively walled through hole on the side of said circuit panel opposite to the first side of said circuit panel;
- pressure producing means for controlling fluid pressure within the first and second hollow members to provide a desired pressure difference across said selected conductively walled through hole; and
- means for passing an electric current through said first and second hollow members to the solder column in said conductively walled through hole to resistively raise the temperature of the solder column to its melting point whereby the solder column and the connector element are forced from said conductively walled through hole by the pressure difference provided across said conductively walled through hole by the pressure producing means.

7. A method of removing a solder column and a connector element from a selected conductively walled through hole in a circuit panel having a plurality of such through holes with solder columns and connector elements in relatively close spaced relationship, comprising the steps of:
- positioning a first hollow member to enclose said selected conductively walled through hole and the connector element extending therefrom on a first side of said circuit panel;
- positioning a second hollow member to enclose said selected conductively walled through hole on the side of said circuit panel opposite to the first side of said circuit panel;
- controlling fluid pressures within the first and second hollow members to provide a desired pressure difference across said conductively walled through hole;
- heating the solder column in said selected conductively walled through hole to the melting point of the solder column whereby the solder column and the connector element are forced from said conductively walled through hole by the pressure difference provided across said conductively walled through hole; and
- preheating the first and the second hollow members to soften solder in physical contact with each of the first and second hollow members on said circuit panel whereby a seal is formed between each of the first and second hollow members and said circuit panel prior to forcing the solder column and the connector element from said conductively walled through hole.

8. A method of removing a solder column and a connector element from a selected conductively walled through hole in a circuit panel having a plurality of such through holes with solder columns and connector elements in relatively close spaced relationship, comprising the steps of:
- positioning a first hollow member to enclose said selected conductively walled through hole and the connector element extending therefrom on a first side of said circuit panel;
- positioning a second hollow member to enclose said selected conductively walled through hole on the side of said circuit panel opposite to the first side of said circuit panel;
- controlling fluid pressures within the first and second hollow members to provide a desired pressure difference across said conductively walled through hole; and passing an electric current through the first and second hollow members to the solder column in said conductively walled through hole to resistively raise the temperature of the solder column to its melting point whereby the solder column and the connector element are forced from said conductively walled through hole by the pressure difference provided across said conductively walled through hole.

* * * * *